United States Patent [19]

Wyman et al.

[11] 4,045,354
[45] Aug. 30, 1977

[54] DEVICE FOR SEPARATION OF LIQUID FROM PASTE OR SEMI-SOLID

[75] Inventors: Charles E. Wyman, South Hadley, Mass.; Robert D. Holstead, Ruston, La.

[73] Assignee: Monsanto Company, St. Louis, Mo.

[21] Appl. No.: 456,495

[22] Filed: Apr. 1, 1974

[51] Int. Cl.² .......................................... B01D 17/00
[52] U.S. Cl. .................................... 210/523; 425/380
[58] Field of Search ................. 100/98 R, 117, 118, 100/126, 150, 188 R; 210/65, 83, 456, 513, 523, 400; 425/380, 467

[56] References Cited

U.S. PATENT DOCUMENTS

| 958,272 | 5/1910 | Nichols | 210/83 X |
|---|---|---|---|
| 1,002,017 | 8/1911 | Warren | 210/65 |
| 1,789,425 | 1/1931 | Cabrera | 210/400 X |
| 3,285,416 | 11/1966 | Eltenton | 210/456 X |
| 3,478,679 | 11/1969 | Bauserman | 100/150 X |
| 3,664,790 | 5/1972 | Hollander | 425/380 X |

FOREIGN PATENT DOCUMENTS

| 220,920 | 8/1958 | Australia | 210/65 |

Primary Examiner—Thomas G. Wyse
Assistant Examiner—Robert H. Spitzer
Attorney, Agent, or Firm—Joseph S. Nelson; William J. Farrington; James C. Logomasini

[57] ABSTRACT

Apparatus for readily separating a low viscosity liquid from an immiscible high viscosity paste or semi-solid comprising a conduit projecting proximate to an upwardly inclined surface provided with means for gravity drainage of the low viscosity liquid. The apparatus is particularly adapted for separating water from a coagulated aqueous latex of polymerized elastomer.

5 Claims, 6 Drawing Figures

DEVICE FOR SEPARATION OF LIQUID FROM PASTE OR SEMI-SOLID

BACKGROUND OF THE INVENTION

Many forms of apparatus utilizing several different principles are known in the prior art for separating liquids from solids or semi-solids and paste. These include vessels for draining, decantation, centrifugation and more highly complex forms of dryers of many types. However, with much of the prior equipment or apparatus separations are not readily carried out when a high viscosity paste or semi-solid is of a lower density than the low viscosity liquid with which it is mixed. Most centrifuges operate to separate a higher density solid, paste or liquid from a lower density low viscosity liquid. In those centrifuges designed to remove the high viscosity material axially this is particularly difficult to accomplish when the high viscosity material does not flow readily at low pressures. On the other hand, when the lower density semi-solid material floats upon the lower viscosity liquid, unless compacted into a paste-like consistency it will not throughly separate by simply draining away or decanting the low viscosity liquid and losses of uncompacted solids or semi-solids will result.

One such mixture of low viscosity liquid and high viscosity paste or semi-solid is a coagulated aqueous latex of a polymerized elastomer. Axial flow centrifuges are plugged when attempting to separate a relatively high viscosity paste or semi-solid. Likewise, attempts to drain away the low viscosity liquid water from a coagulated latex of such a composition yields slow separation of the water and is not adapted for continuous operation. This invention provides a new and useful apparatus for effecting such separations.

SUMMARY

The present invention provides apparatus for readily separating a low viscosity liquid from an immiscible, high viscosity paste or semi-solid where the two materials are in separate phases. The apparatus comprises a conduit for the two-phase mixture which can serve to consolidate or compact the pasty semi-solid phase and forward the two phase mixture to a proximate upwardly inclined surface from which drainage of the separate low viscosity liquid phase takes place. The inclined surface can be either fixed, allowing passage of the paste phase by feed pressure only, or driven, whereby the paste phase is supported and forwarded. When such an immiscible, two-phase mixture is introduced into the conduit consolidation and compaction of the pasty semi-solid phase takes place and upon forwarding said mixture onto said inclined surface the low viscosity liquid phase is separated therefrom by the force of gravity. The efficiency of such separation can be increased by provision of means to define drainage passages in said pasty phase.

The apparatus of the present invention possesses many advantages over prior separation apparatus. It is particularly well adapted for separation of water from a coagulated aqueous latex of polymerized elastomers. The present apparatus is simple and economical in construction and can be sized to handle a widely variable volume of material mixtures. It is efficient in separation of substantially all free separate phase low viscosity liquids and a predominant proportion of the total liquid present in a mixture. It can be used in an intermittent, batch-wise process or a continuously operated one. In the preferred embodiments it requires no added power inputs for operation.

DESCRIPTION OF PREFERRED EMBODIMENTS

The description of the construction and operation of the apparatus of the present invention can be better appreciated with reference to the drawings. The operation will be described with reference to separation of water from a paste or semi-solid coagulated polymeric elastomer. Such elastomeric polymers are produced as an aqueous latex dispersion and are therefore coagulated by any suitable means, sometimes with addition of organic liquids to said latex prior to or concurrently with coagulation of the polymeric portion of the latex. Coagulation of the latex produces the immiscible two-phase mixture of elastomer particles and associated organic liquids as one phase and water as the low viscosity liquid phase, which phases are separated by the apparatus of this invention.

Figure 1:
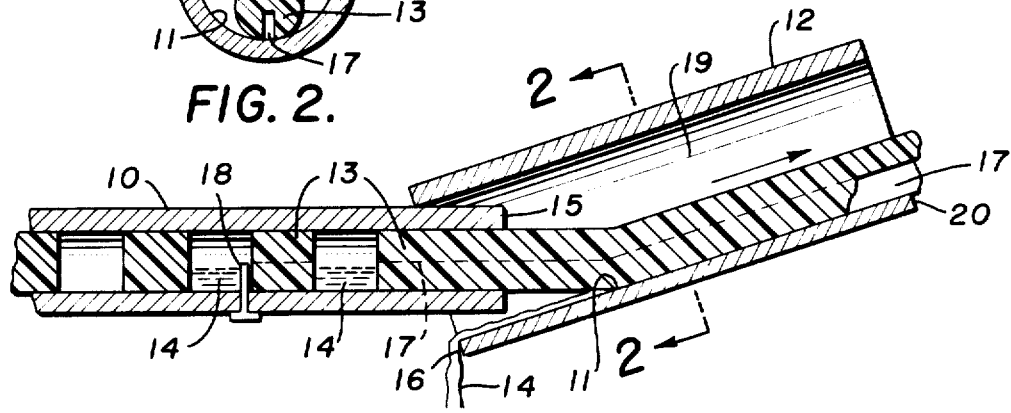
FIG. 1 is a side elevation in section of one embodiment of the present invention.

Referring to FIG. 1, there is illustrated the simplest preferred embodiment of the present invention comprising a conduit 10, fixed in relation to and projecting proximate to an upwardly inclined surface 11, which, as illustrated, may take the form of a pipe or conduit 12 of larger diameter than the conduit 10, or may be a flat surface or other surface as desired. Conduit 10 and surface 11 may be fixed in relation to each other by any desired means, not shown, as by welding, bolting, or the like or securing both to a separate frame by any desired means. Drain passage cutting means 18 is a preferred alternative and may take the form of a bolt, screw, plate, tang or other form of relatively thin projection from the wall of conduit 10.

Figure 2:
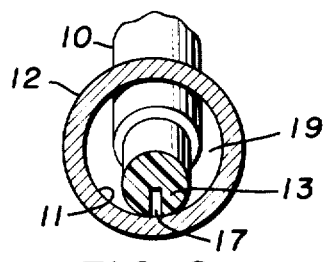
FIG. 2 is a sectional view taken at 2—2 of FIG. 1.

In operation a coagulated aqueous latex of a polymeric elastomer to which an organic liquid may have previously been added is introduced into a conduit 10 and forwarded through same by means of pressure applied thereto, as by a pump in the feed line, not shown, to said conduit 10. The separate coagulated polymer and organic liquid or coagulum phase 13 is caused to be consolidated or compacted by friction with the sides of the conduit 10 under continued pressure induced by the pump in the feed line and the free water to collect as pockets 14 in or about the coagulated polymer or coagulum 13. When the forwarding of the coagulum by continued pump pressure reaches the passage forming means 18, additional compaction of the coagulum results. With continued forwarding under pressure a drain channel 17, as shown in FIG. 2, is formed in the coagulum 13, which permits the water to flow through the paste 13 and drain out exit 15. The coagulum 13, compacted into a strand, is forwarded under continued pump pressure out the exit 15 of conduit 10 and brought into contact with inclined surface 11. The additional friction of contact with surface 11 induces some additional compaction of the coagulum 13 and may liberate more water 14 which is drained by gravity along surface 11 to exit at end 16 of surface 11.

In the embodiment shown, surface 11 comprises the wall of a larger conduit or tube 12 which provides free space 19 about the advancing coagulum. It will be apparent that surface 11 can likewise comprise a lower wall of any shaped conduit, trough or flat surface as well as the open cylindrical conduit 12 shown. The compacted coagulum 13 is advanced up inclined surface 11 to the opposite end thereof and is expelled therefrom to any desired receptacle or vessel, not shown.

FIG. 2 shows a cross-section of conduit 12 with inclined surface 11 bearing thereon a stream of coagulum 13 in which a drain passage 17 has been formed for improved drainage of free water away from the coagulum.

Figure 3:
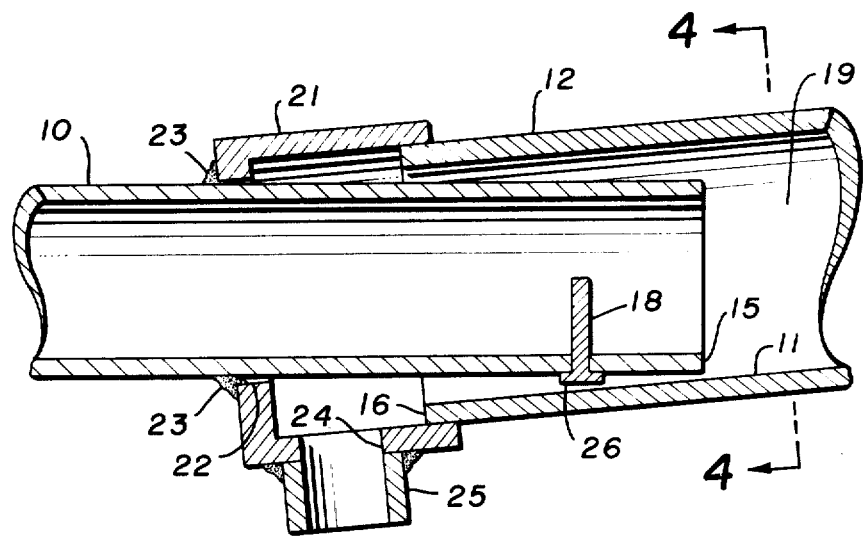
FIG. 3 is a side elevation in section of an alternative embodiment of the present invention.
Figure 4:
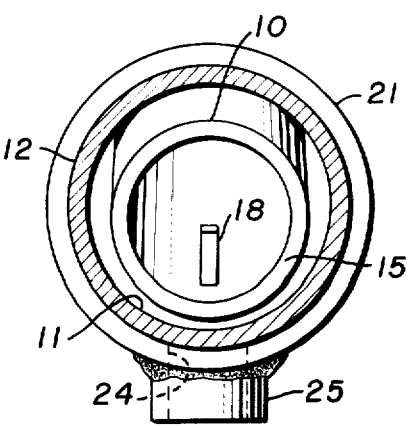
FIG. 4 is a sectional view taken at 4—4 of FIG. 3.

Referring to FIGS. 3 and 4 there is shown an alternative embodiment of the apparatus of the present invention providing improved control of free water drainage. In FIG. 3 a cap 21 is fixed over the end 16 of conduit 12 having an aperture 22 in the end thereof for admitting conduit 10. The cap 21 is fixed to conduit 12 by screw threads, welding or any other convenient means, not shown, while conduit 10 is fixed in sealing relation with aperture 22 by any convenient sealing means 23, such as welding, gasketing or the like. Cap 21 is also provided with an aperture 24 to which is fixedly mounted drain conduit 25 to carry off water drained from the coagulum. It will be apparent that a sufficient clearance must be maintained between surface 11 and the end 15 of conduit 10 and the head 26 of passage forming means 18 to provide for draining water exiting conduit 10 at 15 and flowing down surface 11 for removal by drain conduit 25.

Both conduits 10 and 12 can be of any desired length, so long as compaction of the coagulum results and sufficient pump pressure is made available to forward the high viscosity coagulum therethrough. Desirably, conduit 12 is made sufficiently short that the coagulum will not fold and fill conduit 12. Likewise, the relative sizes of conduits 10 and 12 is not critical so long as conduit 12 has a larger interior diameter to afford free space 19 about the coagulum. It has been found desirable to maintain the diameter of conduit 12 from about 1.3 to 2.0 times the diameter of conduit 10 to diminish any tendency of the coagulum to fold and plug conduit 12. The angle of inclination of surface 11 to proximate conduit 10 is likewise not critical. However, to decrease the possibility of folding of the plastic coagulum, it is preferred that such angle be greater than 0°, for example 3° to 5°. The compaction of the coagulum is improved at higher angles such as 10° to 25°, but correspondingly higher pump pressures on the feed are required to forward the high viscosity coagulum along surface 11, as will be apparent.

Figure 5:
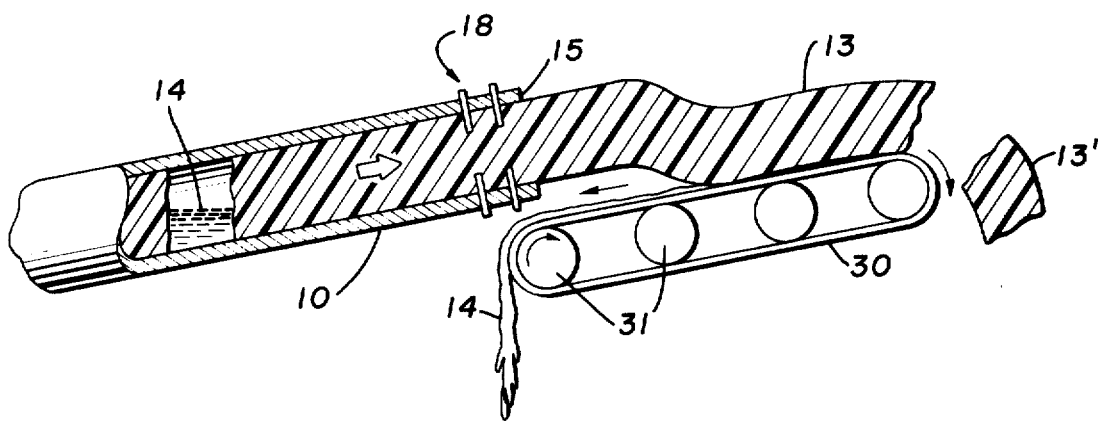
FIG. 5 is a side elevation in section of another embodiment of the present invention.

In FIG. 5, there is illustrated a different embodiment of the present invention which is suitable for supporting a less highly compacted coagulum or for forwarding same to a remote receptacle or point of use. The conduit 10 corresponds in both structure and function to conduits 10 in FIGS. 1 and 3 above, except for a plurality of passage forming means 18 for the formation of a plurality of drain passages in the coagulum. The inclined surface proximate to the exit of conduit 10 takes the form of a moving belt or conveyor 30, driven by driving rollers 31. The width of belt 30 is not critical, being required to be of only sufficient width to retain the coagulum thereon. Likewise, the length thereof is not critical, but adaptable to the distance required to reach the succeeding receptable or vessel. As shown, the coagulum 13' can be allowed to break off and drop by gravity into any suitable vessel, if desired. As in the embodiments shown in FIGS. 1 and 3 above, the water 14 separated from the coagulum 13 drains down the belt 30 by gravity. The speed of the driven rolls 31 and the belt 30 can be selected as desired. It can be adjusted to approximate the speed of the coagulum 13 expelled from conduit 10, or it can be driven at a slightly higher speed. In general, it is preferred to drive the belt 30 at a slightly slower speed than the expelled coagulum to induce additional consolidation and compaction thereof.

Figure 6:
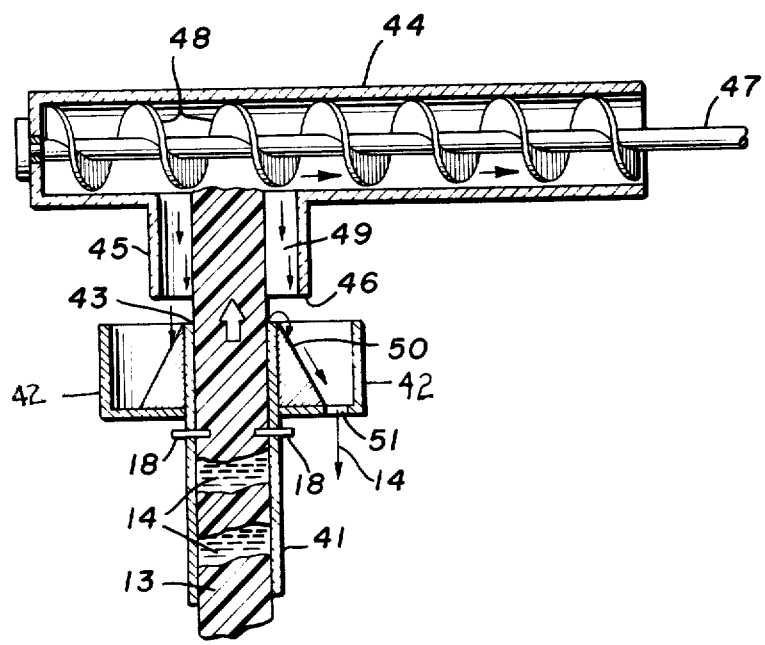
FIG. 6 is a side elevation in section of still another embodiment of the present invention.

In FIG. 6, a still different embodiment of the present invention is illustrated for forwarding a coagulum under positive pressure to succeeding vessels. In the embodiment of FIG. 6, the conduit takes the form of a vertical pipe 41 provided with a drain collar 42 about the upper end thereof, having one or more lower apertures 51 and fixed to pipe 41 by suitable means 50, such as welding or the like, which fixing means may be desirably sloped from the vertical, as shown. The proximate inclined surface onto which the coagulum 13 is fed comprises flights 48 carried on shaft 47 and mounted in a body 44, which desirably is cylindrical, the whole comprising a screw pump. The screw pump body 44 and port 45 therein is mounted in fixed relation to conduit 41 by any suitable means, not shown. In a preferred alternative, not shown, port 45 may comprise a concentric inner conduit of approximately the diameter of pipe 41 and an outer concentric drain aperture.

In operation the coagulated aqueous latex feed is compacted and consolidated by friction and gravity in pipe 41 into segments of coagulum 13 and free water 14 and forwarded out the exit 43 of conduit 41. The free water drains into collar 42 and is drained away through aperture 51. The consolidated coagulum is forwarded through aperture 45 in pump body 44 and into contact with flights 48 which are driven by suitable means, not shown. Contact with the flights 48 induces additional compaction in the coagulum 13 freeing more water which drains around the coagulum 13 at 49 through aperture 44 at exit 46 and is likewise collected in collar 42 and removed via drain aperture 51. The driven shaft 47 and flights 48 operate in conjunction with body 44 to forward the coagulum to any desired remote point or vessel.

The aqueous latex of a polymerized elastomer which has served to exemplify the use of the present invention is required to be at least partially and preferably completely coagulated prior to introduction into the present apparatus. Such coagulation can be brought about by any desired means. In general, the elastomer content of an emulsified latex is coagulated by adding thereto, generally as an aqueous solution or dispersion, a coagulant and subjecting same to mixing. Many coagulants are known for elastomer latices including mineral salts, acids, polymeric electrolytes and the like, and any desired coagulant can be used to induce coagulation in a latex suitable for use as a feed to the present apparatus for separation of the water present. Likewise, the degree of mixing of a coagulant can be selected to provide thorough coagulation of elastomer. With many elastomer latices only the mixing resulting from introduction of coagulant solution at a T-joint in the feed line to the present apparatus is sufficient to result in coagulation.

With other latices, some additional mixing at relatively low shear rates has been found advisable, such as in a low shear screw pump of the Moyno type or the like. The addition to a latex of certain organic liquids which tend to swell or solve the elastomeric particles or portions thereof can sometimes induce coagulation of the elastomer and formation of free water therefrom with the addition of little or no coagulant. In any case, it is only necessary that the elastomer latex be coagulated to a degree sufficient to free water therefrom in order to serve as a suitable feed to the present apparatus.

The consolidated and compacted coagulum product produced by the present apparatus is largely separated from free, flowable water and is suitable for a variety of industrial operations and processes. The coagulum can be collected in a vessel and held to supply blending and/or polymerization processes if desired. It can be forwarded continuously or batchwise to continuous polymerization reactors. If it is desired to further decrease the water occluded to the elastomer particles of the coagulum product, it can be fed directly to any desired apparatus for inducing greater pressure for compaction thereof to free additional water therefrom. One such suitable apparatus which can be fed by the present apparatus is a dewatering screw device disclosed in copending patent application of R. D. Holstead and C. E. Wyman, Ser. No. 323,470 filed Jan. 15, 1973, now U.S. Pat. No. 3,859,217. The embodiments shown in FIGS. 1, 3 and 6 are adapted to directly feed such a dewatering screw apparatus, through an input port thereof while that shown in FIG. 5 can be adapted to feed such apparatus through an intervening vessel, pump and/or feed line. Likewise, the present apparatus can be employed with such a dewatering screw device at a paste exit port thereof to drain away any water freed, for example, in the pumping section of such dewatering screw and exiting therefrom with the coagulum or dewatered paste. The embodiments shown in FIGS. 1 and 3 hereof are particularly well adapted for use at the paste exit port of such dewatering screw apparatus.

However, it is not essential to the uses of the coagulated latex coagulum that any additional water be removed therefrom. The apparatus of the present invention has been found to remove from a coagulated elastomer latex from 60 to 70 percent of the total water present therein. For example, the apparatus of the present invention was employed in several runs with an elastomer aqueous latex to which had been added approximately 20 parts of acrylonitrile and 10 parts of styrene per 100 parts of latex, and to which was added at a T-joint in the feed line approximately 10 parts of a 4 percent aqueous solution of magnesium sulfate or aluminium sulfate. At total flow rates of from about 56 to 75 kgs/hour (125 to 165 pounds/hour) there was separated and removed approximately 65 percent of the total water present. The apparatus embodiment used was that illustrated in FIG. 3 wherein the compaction conduit comprised a pipe of 3.2 cm. diameter and 20 cm. length while the inclined separator circuit comprised a pipe 5.1 cm. in diameter and 20 cm in length fixed at an angle of approximately 5° upward inclination from the axis of the compaction conduit and provided with a cap and drain at the entry thereof. The latex was fed to the apparatus and forwarded therethrough by the pressure developed by a Zenith gear pump in a 0.63 cm feed pipe, while the coagulant solution was fed by a similar Zenith gear pump through the same size pipe to a T-joint in said feed pipe. Thus the apparatus of the present invention was found to efficiently separate free water as a low viscosity liquid from a coagulated polymer latex high viscosity paste or semi-solid.

What is claimed is:

1. Apparatus for separating a low viscosity liquid from an immiscible high viscosity paste, and apparatus comprising in combination a compaction conduit for the liquid and paste in fixed relation and projecting proximate to an upwardly inclined surface for receiving a compacted liquid and paste, the surface provided with means for gravity drainage of the low viscosity liquid wherein said conduit has at least one means for forming a drain passage in said paste.

2. The apparatus of claim 1 wherein said drain forming means comprises a bolt, screw, plate or tang projecting from the interior wall of said conduit.

3. Apparatus for separating a low viscosity liquid from an immiscible high viscosity paste, said apparatus comprising in combination a compaction conduit for the liquid and paste in fixed relation and projecting proximate to an upwardly inclined surface for receiving a compacted liquid and paste, the surface provided with means for gravity drainage of the low viscosity liquid wherein said inclined surface is a screw pump rotor flight.

4. An apparatus of claim 3 wherein said means for gravity draining of the low viscosity liquid is a port interconnected with said screw pump rotor flight.

5. Apparatus for separating a low viscosity liquid from an immiscible high viscosity paste, said apparatus comprising in combination a compaction conduit for the liquid and paste in fixed relation and projecting proximate to an upwardly inclined surface for receiving a compacted liquid and paste, the surface provided with means for gravity drainage of the low viscosity liquid wherein the end of said conduit remote from said inclined surface directly abuts a paste exit port of a dewatering screw device.

* * * * *